Aug. 23, 1960  E. O. OSBORN  2,950,034
WATER BAG CARRIER FOR VEHICLES
Filed Nov. 6, 1957
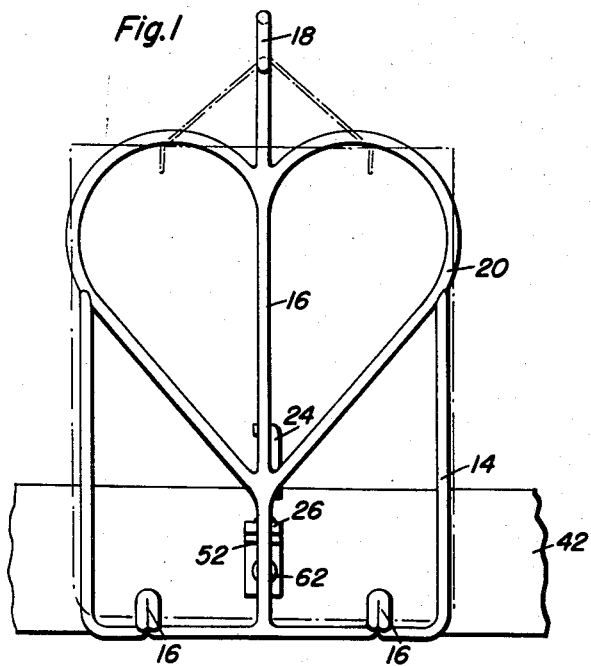
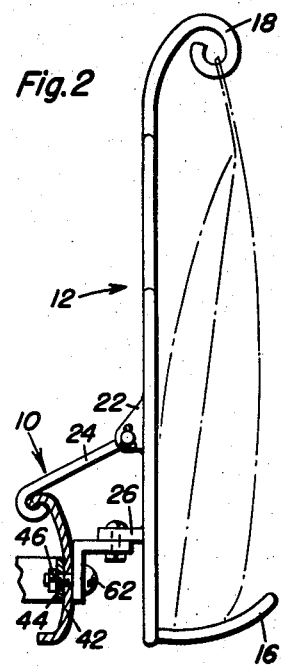
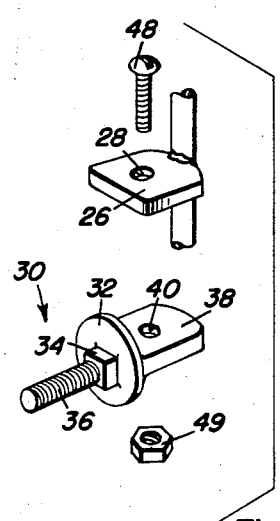
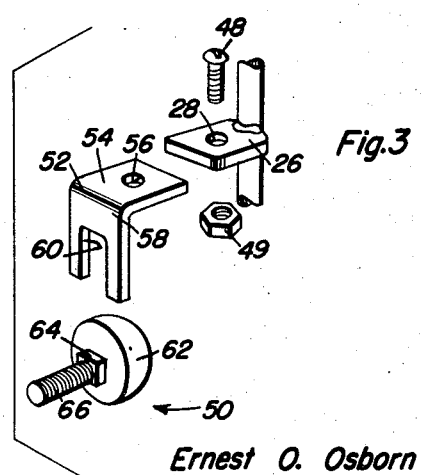
Ernest O. Osborn
INVENTOR.

United States Patent Office 2,950,034
Patented Aug. 23, 1960

2,950,034
WATER BAG CARRIER FOR VEHICLES
Ernest O. Osborn, P.O. Box 1228, Victorville, Calif.
Filed Nov. 6, 1957, Ser. No. 694,875
3 Claims. (Cl. 224—42.03)

This invention relates generally to new and improved attachments for vehicles, and more particularly to a water bag carrier for vehicles.

The primary object of this invention is to provide a water bag carrier for vehicles, which will hold a water bag in proper position on a vehicle, so that the water bag will not scrape against the car or the ground, which would of course form a hole in the water bag.

A further object of this invention is to provide a water bag carrier for vehicles wherein new and novel means are provided for adapting this carrier to be connected to a variety of different type vehicles, having different size and shape bumpers, to which this water bag carrier may be attached.

An even further object of the invention is to produce a simple and inexpensive device yet one which will be exceedingly effective for the purpose for which it is designed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view illustrating the device as it would appear as connected to a vehicle;

Figure 2 is a side elevational view of the device illustrated in Figure 1;

Figure 3 is an exploded perspective view of the bracket portion of the device as it would be used for fastening the same to a bumper having a conventional bumper bolt; and Figure 4 is a perspective, exploded view illustrating the modified form of the bracket portion of the invention, illustrating the parts as they would be used with a special type of bumper bolt.

Referring now more specifically to the drawings, the numeral 10 generally designates a bumper bracket comprising a portion of the invention, this bracket being connected to a water bag carrying frame 12.

The frame 12 generally consists of a U-shaped frame member 14, having forwardly and upwardly curved arm portions 16, which serve to support the lower portion of the water bag, as can be observed in Figure 2. The central vertical frame member 16 is connected to the bight of the U-shaped member 14, and extends upwardly into a smoothly curved hook portion 18, which will accommodate a strap for supporting the water bag. The rest of the frame member 20, may be made in any suitable shape, however, a heart shape 20 is illustrated.

In order to connect the frame 12 to the bumper of a vehicle, a vertical outwardly projecting flange 22 is provided, which has an elongated hook 24 pivotally connected thereto. Located downwardly along the frame member, a second projecting flange 26 is horizontally disposed outwardly of the frame, and has a central opening 28 formed vertically therethrough.

A special type of bumper bolt 30 is provided having a circular head 32, a square portion projecting outwardly from the inner surface of this head 32, a threaded shank portion 36, and a flat head 38 having an opening 40 formed therethrough. When it is desired to connect the bracket to a conventional bumper 42 having an opening 44 therein, the bumper bolt 30 is inserted into the opening 44 in bumper 42, and held in place by means of nut 46. Then, the projecting flange 26 would be disposed over flattened head 38 with openings 28 and 40 aligned, so that a bolt 48 may be inserted through the aligned openings and fixed therein by means of nut 49. Then, elongated hook 24 will be disposed about the upper portion of bumper 42, and it will be seen that the frame would thus be locked onto the bumper of the vehicle.

If, however, it is desired to use this water bag carrying frame with a conventional bumper bolt 50 rather than with the special type 30, a special angle bracket 52 is provided having one leg 54 with an opening 56 disposed therethrough, and the other leg 58, having a slot 60 formed therein. The conventional bumper bolt 50 has a rounded head 62, with a projecting square-shaped portion 64, and a threaded shank portion 66 extending from the square-shaped portion. This conventional bumper bolt 50 would be loosened, and the angle bracket 52 inserted beneath the head of same, with the slot 60 accommodating square portion 64. Then, the bolt would be tightened, and openings 28 and 56 in the flange 26 and angle bracket 54 respectively would be aligned, and bolt 48 and nut 49 used to detachably fasten the members together.

It may now be seen that I have herein shown and described a new and improved type of water bag carrier for vehicles, which is universally adjustable so as to be accommodated on a great variety of vehicle models and types.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on a bumper of a motor vehicle, a water bag carrier comprising a substantially vertically disposed frame having an attaching means on one side thereof adapted to removably attach said frame to a motor vehicle bumper of the type having a bumper bolt removably secured therethrough, said frame having upper and lower support means vertically spaced from each other adapted to support a water bag therebetween, said attaching means including an angle bracket having one leg apertured and a slot formed in the other leg, said other leg being adapted to be inserted beneath the head of said bumper bolt, said one leg projecting towards said frame, an apertured flange carried by and extending from said frame towards said bumper parallel to said one leg, the apertures in said flange and said one leg being alined and having a fastener secured therethrough, said slot being of sufficient width to be adapted to receive not only the shank of said bolt but the usual square projection on the shank side of the head thereof.

2. The combination of claim 1 including a brace comprising an elongated hook-like member having one end pivotally mounted to said frame for rotation about a horizontal axis extending longitudinally of said bumper and a curved hook-like portion on the other end adapted to engage an edge of said bumper.

3. For use on a motor vehicle bumper of the type having an opening formed therethrough, a water bag carrier comprising a substantially vertically disposed frame having an attaching means on one side thereof adapted to removably attach said frame to said bumper, said frame having upper and lower support means vertically spaced from each other adapted to support a water bag therebetween, said attaching means including a bumper bolt having an apertured flange projecting outwardly from the head thereof, an apertured flange carried by and extending from said frame towards said bumper parallel to said first flange, the apertures in said first and second flanges being alined and having a fastener secured therethrough, a brace comprising an elongated hook-like member having one end pivotally fastened to said frame for rotation about a horizontal axis extending longitudinally of said bumper and a curved hook-like portion on the other end adapted to engage an edge of said bumper.

References Cited in the file of this patent

UNITED STATES PATENTS

| | | |
|---|---|---|
| 1,400,758 | Mansfield | Dec. 20, 1921 |
| 2,592,050 | McCharen | Apr. 8, 1952 |
| 2,594,640 | Greuling | Apr. 28, 1952 |
| 2,620,105 | Erickson | Dec. 2, 1952 |
| 2,645,393 | Campbell | July 14, 1953 |
| 2,672,264 | Steven | Mar. 16, 1954 |
| 2,692,071 | Eastmoore | Oct. 19, 1954 |
| 2,709,545 | Cryer | May 31, 1955 |
| 2,729,373 | Stump | Jan. 3, 1956 |
| 2,797,036 | Geiger | June 25, 1957 |
| 2,835,424 | Pierce | May 20, 1958 |